(12) United States Patent
Hitzschke et al.

(10) Patent No.: US 6,657,392 B2
(45) Date of Patent: Dec. 2, 2003

(54) DISCHARGE LAMP FOR DIELECTRICALLY IMPEDED DISCHARGES COMPRISING SUPPORTING ELEMENTS BETWEEN A BOTTOM PLATE AND A COVER PLATE

(75) Inventors: Lothar Hitzschke, Munich (DE); Frank Vollkommer, Buchendorf (DE)

(73) Assignee: Patent-Treuhand-Gesellschaft fuer Elektrische Gluehlampen mbH, Munich (DE)

( * ) Notice: Subject to any disclaimer, the term of this patent is extended or adjusted under 35 U.S.C. 154(b) by 0 days.

(21) Appl. No.: 10/130,597

(22) PCT Filed: Sep. 5, 2001

(86) PCT No.: PCT/DE01/03407
§ 371 (c)(1),
(2), (4) Date: May 21, 2002

(87) PCT Pub. No.: WO02/27761
PCT Pub. Date: Apr. 4, 2002

(65) Prior Publication Data
US 2002/0163311 A1 Nov. 7, 2002

(51) Int. Cl.[7] ................................................. H01J 1/02
(52) U.S. Cl. ............................. 315/58; 315/56; 313/491
(58) Field of Search ................................. 313/491, 492, 313/493; 315/56, 58, 246, 260; H01J 1/02

(56) References Cited

U.S. PATENT DOCUMENTS

| 6,211,615 B1 | * | 4/2001 | Altmann et al. | 313/631 |
| 6,376,989 B1 | * | 4/2002 | Vollkommer et al. | 315/274 |
| 6,411,039 B1 | * | 6/2002 | Vollkommer et al. | 315/58 |
| 6,545,427 B1 | * | 4/2003 | Vollkommer et al. | 315/246 |

FOREIGN PATENT DOCUMENTS

| DE | 40 10 809 | 10/1990 |
| EP | 0 389 980 | 10/1990 |

* cited by examiner

*Primary Examiner*—Tho Phan
(74) *Attorney, Agent, or Firm*—Robert F. Clark

(57) ABSTRACT

The invention relates to a silent discharge lamp in which support elements for supporting a top plate opposite a base plate are designed as a unipartite component of the top plate and have a tapering contour.

19 Claims, 4 Drawing Sheets

DISCHARGE LAMP FOR DIELECTRICALLY IMPEDED DISCHARGES COMPRISING SUPPORTING ELEMENTS BETWEEN A BOTTOM PLATE AND A COVER PLATE

TECHNICAL FIELD

The present invention relates to discharge lamps that are designed for dielectrically impeded discharges and are also designated as silent discharge lamps. Such discharge lamps have an electrode set for producing discharges in a discharge medium that is located in a discharge space of the lamp. Provided in this case between at least one part of the electrode set and the discharge medium is a dielectric layer that forms the dielectric impediment. In the case of lamps in which it is fixed whether the electrodes operate as cathodes or anodes, at least the anodes are dielectrically separated from the discharge medium.

BACKGROUND ART

Such lamps are prior art and have recently been enjoying increasing attention, chiefly because it is possible with the aid of a pulsed mode of operation (U.S. Pat. No. 5,604,410) to achieve relatively high efficiencies that make use as a source of visible light or as a UV radiator seem attractive for various fields of application. Of particular interest in this case are lamps in which the discharge space is located between two generally plane-parallel plates that are denoted below as base plate and as top plate. In this arrangement, at least the top plate is at least partially transparent, being capable, of course, of bearing on its side facing the discharge space a fluorescent material that is not itself transparent in the true sense. Such lamps with a plate-like design are of interest chiefly as flat discharge lamps, for example, for backlighting purposes in the case of displays, monitors and the like.

In order to ensure sufficient stability in the case of relatively large lamp formats, it is possible to use between the base plate and the top plate support elements that are located inside the discharge space and connect the base plate and the top plate to one another. In the outer region, the plates can be connected via a frame that encloses the discharge space and is not denoted here as a support element. The support elements shorten the bending length between the outer edges of the plates in the region of which the frame described can be provided, and thereby improve the stability of the lamp against bending loads and compressive loads. It is also to be borne in mind in this case that silent discharge lamps are frequently filled with a discharge medium exhibiting low pressure such that a generally relatively large part of the external atmospheric pressure bears on the plates.

DISCLOSURE OF THE INVENTION

Starting from this prior art, the invention is based on the technical problem of specifying a silent discharge lamp of the type described having improved support elements.

The invention therefore provides: a discharge lamp having a base plate, a top plate for the light exit, which is at least partially transparent, a discharge space between the base plate and the top plate for holding a discharge medium, an electrode set for producing dielectrically impeded discharges in the discharge medium, a dielectric layer between at least one part of the electrode set and the discharge medium, and at least one support element which produces a connection between the base plate and the top plate, characterized in that the support element is a supporting projection which is constructed as a unipartite component of the top plate, and the outer contour of the supporting projection tapers in the direction from the top plate toward the base plate in at least one cutting plane perpendicular to the base plate.

The invention further relates to a display device with such a discharge lamp and thus, for example, a flat display screen, a display or the like using LCD technology.

In a departure from the relevant prior art, in which the support elements are placed as separate glass balls between the plates, the invention firstly adopts the approach of constructing the support elements as integrated components of the top plate. These are thus projections of the top plate that are directed toward the base plate and are a unipartite component of the top plate. The top plate is preferably already produced with these projections with the aid of a suitable shaping method, for example thermoformed or compression-molded. However, the projections can also be integrally formed subsequently. It is, however, essential that when assembling the lamp the top plate has supporting projections that are designed in a unipartite fashion with it. The outlay on the positioning and fixing of separate support elements between the plates should then be eliminated during assembly of the lamp. However, for example, it can also be sensible for the purpose of fastening the support projections on the base plate to provide a connecting element—made from solder glass, for example—between the base plate and the supporting projections.

Furthermore, the invention is based on the idea that a unipartite construction of spacer elements with the base plate, which arises as development from the conventional supporting balls to be connected to the base plate is more unfavorable because the contact between the support elements and the plates produces shadows in the luminance distribution that impair the homogeneity. It has emerged that these shadows are more pronounced the smaller the distance of the contacts causing the shadows from the light-emitting plane of the top plate. It is therefore regarded as more favorable not actually to avoid such contacts completely, but to arrange them situated as deeply as possible, that is to say remote from the light-emitting side. By this means, the shadows merge to a greater extent in the luminance distribution of the lamp, particularly when diffusers or other elements homogenizing the luminance are also used on the top side of, or above, the top plate. The larger the distance between such diffusers and similar elements and the structures causing shadows, the more effectively it is possible to distribute the shadows extensively or resolve them again.

The invention also provides that the supporting projections extend out from the top plate toward the base plate in a tapering shape. The tapering is intended in this case to occur in at least one cross-sectional plane that runs through the supporting projection perpendicular to the base plate. In this arrangement the plates need not necessarily be plane and parallel to one another. The term "perpendicular" is to be understood locally, as appropriate. Tapering means that the extent of the supporting projection in the direction along the plates ("along" is also to be understood locally, as appropriate) in the cross-sectional surface in the region just above the base plate is smaller than in a region further removed from the base plate. The supporting projection is therefore intended to be narrower in the direction of the base plate. In this case, the tapering can preferably encompass the entire height of the supporting projection.

Various advantages, which need not necessarily be present in parallel, can be achieved through this shaping.

Firstly, narrower supporting projections produce smaller shadow effects in the region of contact with the base plate. Secondly, in any case when individual localized discharge structures are produced over the base plate with the aid of the pulsed operating method, these discharge structures can be distributed over the base plate largely without being influenced by the supporting projections when the lamp is being designed. It is possible for this reason to achieve a good degree of homogeneity of the luminance and a relatively dense arrangement with the discharge structures. Thirdly, such forms of supporting points can also be important for optical properties of the top plate, as will become even clearer in the following course of the description.

The basic idea of the invention is directed to the structure of an individual supporting projection. Of course, the invention preferably relates to discharge lamps having a multiplicity of supporting projections. In particular, there is no mandatory aim of the invention to keep the number of supporting projections as low as possible, as is the case in the prior art. Rather, the invention is directed to those lamps in the case of which a relatively large number, for example a number comparable to the number of the individual discharge structures, of supporting projections are used. In this case, the above statements preferably hold for most or all of these supporting projections. However, in the most general sense only one supporting projection need be present or be provided according to the invention.

In order to avoid additional shadings and to utilize possible positive optical effects of the supporting projections, the latter preferably consist of an optically transparent material. However, they can in this case be coated entirely or partially with a fluorescent material, as is also the case with the remaining top plate. The supporting projections and the remainder of the top plate preferably consist of glass.

The shaping of the supporting projections is preferably designed such that not only is a cross-sectional plane with a tapering cross section produced, but, moreover, there is also no cross-sectional plane in which the supporting projection widens substantially in the direction of the base plate. When expressed in other words, this means that the outer surface of the supporting projections faces the discharge space of the base plate, in any case the important part of the outer surface. It is also possible for there to be individual regions of the outer surface that run perpendicular to the base plate, but not over a substantial part of the circumference of the supporting projections. In this case, the outer surface extends from the base plate up to the top plate, which means that it is not a small subregion of the outer surface that is involved here.

The outer surface of the supporting projection is intended to form in relation to a plane that cuts the supporting projection and runs at least locally parallel to the base plate between the top plate and the base plate, an angle of preferably at least 120°, better at least 130° and, in the most favorable case, 140° or more, this angle being defined in a cutting plane perpendicular to said plane and in the direction of the base plate. The angle thus refers, as an obtuse angle, to an outer surface of the supporting projection tipped toward the base plate. With such obliquely situated outer surfaces, space for the discharges can still be created in the vicinity of the underside of the supporting projection adjacent to the base plate, on the one hand, but on the other hand these oblique outer surfaces are important for possible optical functions of the supporting projections.

Specifically, when the supporting projections according to the invention are limited by the obliquely running outer surfaces described, by refraction of light impinging from the discharge space, or by appropriate alignment of the emission characteristics of a fluorescent layer on the outer surface, they ensure an alignment of light into the core region of the supporting projections. It is thereby possible to counteract the shadow produced by the contact with the base plate.

Furthermore, together with a pattern, prescribed by the electrode structure, of individual discharges it is possible to undertake an optimization to a luminance that is as homogeneous as possible in an overall design of the arrangement of supporting projections and of the discharge structure. In addition to the shadow effect of the contact between supporting projection and base plate, it has also specifically to be taken into account that the individual discharge structures typically burn not below, but between supporting projections. Consequently, the maxima of the UV generation are likewise situated between the supporting projections. As a result of the effect of optical deflection, the light can be brought partly from these regions into the regions of the supporting projections so as to produce a relatively homogeneous luminance on the top side of the top plate. Thus, the basic idea of the invention consists at this junction in a departure from the prior art in considering the supporting projections not as disturbances in the luminance, to be homogenized separately, of the discharge structure. Rather, in the case of the invention the supporting projections preferably assume an active role in the light distribution and are taken into account in the overall design exactly as is the discharge distribution, which is likewise inherently inhomogeneous. The aspect of the invention addressed here is brought out more vividly by the exemplary embodiments.

To the extent that this application talks of individual discharges or discharge structures, these statements relate, strictly speaking, to regions prescribed by the design of the lamp, in particular of the electrodes and the supporting projections, in which such individual discharge structures can burn. Depending on the operating state of the lamp, however, variously extended discharge structures are also conceivable in this case within these regions. Thus, the regions need not necessarily be filled entirely with a discharge structure. Above all, the desire can be to influence the size of the discharge structures in conjunction with dimming functions of the lamp. The statements in this application therefore relate to the regions which can be filled to the greatest extent with discharge structures. To the extent that electrode structures are provided for determining preferred positions of discharges, there will generally be a 1:1 correspondence with the discharge regions.

As already touched upon, the supporting projections are to taper in the direction of the base plate. It is optimal in this case when the supporting projections are as narrow as possible in the region of the contact with the base plate, the term "narrow" being measured in relation to the other dimensions of the supporting projection. "Narrow" is in this case a path forming a small fraction, for example less than ⅓, ¼ or ⅕ of a typical transverse dimension (along the plates) of the supporting projection, for example half the height of the discharge space. This narrowness should be present in this case in at least one direction, but preferably in two directions in the "local" plane of the base plate. In other words, it can be a linearly narrow or approximately punctiform contact surface.

Very generally, even in the case of somewhat larger bearing surfaces in relation to the base plate, the supporting projections can run substantially like ribs along the top plate, or be limited to small regions in relation to the dimensions of the plates. In the first-named case, it is the linear contact surfaces that are the general concern for narrow contact surfaces, while in the second case it is the approximately punctiform ones. The rib-like supporting projections can have specific stabilization functions, for example they can provide the top plate with an improved bending strength in one direction. Furthermore, as will be explained in still further detail in the exemplary embodiments, they can also serve to separate specific regions in the discharge space slightly from one another, in order to influence the discharge distribution. Thus, together with the electrode structure they can define preferred locations for individual discharges and separate individual discharges from one another along identical electrodes. On the other hand, the supporting projections limited locally in two directions in the plane of the plate offer the possibility of minimized shadow effects, and are generally sufficient for the support function.

A preferred shape for locally limited supporting projections can therefore be formed by a cone or by a pyramid, in the case of which the vertex touches the base plate (and is possibly somewhat flattened off or rounded in the process). In principle, any desired basic shapes come into consideration for the cones and pyramids, that is to say surfaces limited with curves, polygonal surfaces or mixtures thereof. However, it is largely supporting projections without edges, that is to say cones, that are preferred, because the edges can lead to certain irregularities in the light distribution.

As already stated, an attempt is to be made to keep the contact surfaces between supporting projections and base plate as small as possible. Limits can exist in this case that are set by production methods (rounding in the case of glass shaping) or by the mechanical point loading of the base plate, so that rather than a supporting projection actually coming to bear "in a pointed fashion" against the base plate, there is a slight rounding or flattening off. As long as this rounding or flattening off is not of any substantial consequence in relation to the size dimensions of the supporting projection, the basic idea of the "narrowness" is not thereby impaired.

However, a preferred feature of the invention is to keep the contact surface between the supporting projection and the base plate as small as possible by virtue of the fact that it results only from bearing by touching. In other words, instances of bonding, solder glass and the like, which would necessarily enlarge the contact surface somewhat, are to be dispensed with as far as possible. For the rest, such additions usually have the disadvantage that they release gases upon heating during lamp production so that extensive pumping operations are required to keep the discharge medium pure. Production is substantially simplified if, in accordance with the invention, such substances are dispensed with. However, it is not excluded in the case of bearing by touching that the supporting projections are pressed slightly into other layers that are required in any case, for example into reflection layers or fluorescent layers on the base plate. A similar statement can hold for a fluorescent coating of the supporting projections themselves.

This bearing purely by touching between supporting projections and base plate generally suffices for the targeted stabilization effect, because mechanical stresses pressing the plates away from one another do not occur, as a rule. This holds, in particular, for the case, which is of most interest technically in any case, in which the discharge lamp is operated with a discharge medium at low pressure. The supporting projections are then pressed against the base plate by the external overpressure. According to an additional aspect of the invention, a multiplicity of supporting projections are provided between the base plate and the top plate. The invention therefore differs additionally from the prior art, in which an attempt was made to use the smallest possible number of support elements. The inventors have verified that, given appropriately more frequent support, it is possible to use comparatively thin base plates and top plates such that it is possible to realize a substantial weight saving for the overall lamp. The overall weight of the lamp is, however, of substantial importance for many applications. Moreover, in the case of relatively light plates the mounting method and automatic mounting devices possibly required therefor can be rendered substantially more simple and less expensive. Moreover, it is of course possible to achieve improved stability with a larger number of supporting projections. Furthermore, the processing times during production are shortened, because thinner plate materials and therefore smaller thermal capacitances occur.

In this case, the supporting projections are to be arranged assigned to individual localized discharge regions in the discharge space. It is firstly to be established in this regard that the individual localized discharge structures have appeared with the already mentioned pulsed operating method even without this invention and were able to be permanently localized by creating preferred sites on the electrodes. However, the invention is not restricted to lamps with such preferred sites. Rather, it transpires that the invention itself results in preferred locations between the supporting projections for individual discharge regions, so that the conventional structures, for example nose-like projections on the cathodes, can also be less strongly pronounced. To the extent that individual discharge structures or regions can be produced between the supporting projections according to the invention independently of the possible pulsed operating method, the invention also relates thereto.

The assignment between supporting projections and individual discharge regions is to be present in the invention at least insofar as the individual discharge regions are respectively surrounded by identical patterns of directly adjacent supporting projections. This excludes, of course, discharge regions in the edge region of the discharge lamp, that is to say in the vicinity of the frame or the lateral closure of the discharge vessel. The aim in this case is to design the pattern of the directly adjacent supporting projections around a discharge region together with this discharge region so as to homogenize the luminance here as far as possible. The relatively large number of supporting projections then does not play a disadvantageous role for the homogeneity (compare the above explanations on the overall design of the discharge lamp). Of course, individual supporting projections can be directly adjacent to more than one discharge region, and this will even be the rule.

It is also preferred that the supporting projections for their part are surrounded as far as possible by the same pattern of directly adjacent discharge regions in each case.

Finally, it is preferably possible to find a plane through the discharge space between the base plate and top plate and a direction in this plane along which the supporting projections and the discharge regions alternate. The alternating row need not be a row alternating directly one after the other (according to the pattern ababab . . . ). Also included is a row in which two supporting projections or two discharge regions occur regularly one after another as long as each supporting projection and each discharge region has at least one discharge region or at least one supporting projection as its neighbor (that is to say, for example, abbabbabb . . . or aabbaabb . . . ).

They need not necessarily be strictly colinear in this direction of the alternating row, but can also be distributed in a somewhat zigzag fashion. It is preferred for a multiplicity of such rows which are parallel to one another to exist in this plane. It is also preferred for there to be in the plane a second direction which is not situated parallel to the first-named direction and along which there is likewise an alternating row of supporting projections and discharge regions. In this case, there is preferably both a set of parallel rows in the first direction and a further set of parallel rows in the second direction. Consequently, the overall result is a planar pattern of supporting projections and discharge regions of alternating design, for example a chessboard pattern.

Moreover, it is preferred in the above definition that the direction along which the alternating row results connects the centers of directly adjacent discharge regions or discharge regions which are at most situated next but one or the centers of directly adjacent support elements or support elements situated next but one. Furthermore, it is preferred in the case of strip-like electrodes for adjacent discharge regions situated on one strip side to be respectively separated by supporting projections.

As already explained, a main aspect of the invention consists in interpreting the supporting projections as a component of the discharge lamp that contributes to the homogenization of the luminance distribution. This aspect is particularly important given the preferably relatively large number of supporting projections. In this case, as long as they are surrounded by a sufficient number of individual discharges, shadowings, occurring regularly in principle, owing to supporting projections can be compensated just as well by diffusers or other homogenizing measures, as was the case in a conventional way for the few supporting projections used. Moreover, the supporting projections can, however, as already explained, also be used themselves to effect light control, for which purpose they consist of optically transmitting material. Although the supporting projections can also be provided with a fluorescent coating, they can also (by comparison with the remainder of the top plate) be wholly or partially free from fluorescent material, for example, they can subsequently be wiped free. They can additionally be brightened thereby, because the unavoidable extinction of the fluorescent layer is eliminated.

Finally, in the case of this invention preference is given to those discharge lamps that are designed for bipolar operation, in the case of which the electrodes therefore function alternately as anodes and as cathodes. Owing to a bipolar operation, the discharge structures, which are inherently generally asymmetric, are superimposed on one another to form a symmetrical distribution on average over time, for which reason the optical homogenization can be further improved.

BRIEF DESCRIPTION OF THE DRAWINGS

A more concrete description of the invention is given below with the aid of the exemplary embodiments. Individual features disclosed in this case can also be essential to the invention in combinations other than those represented. Moreover, the individual features in the above description and that which follows relate to aspects of the device and of the method of the invention. In detail.

BEST WAY FOR CARRYING OUT THE INVENTION

Figures 1, 2:
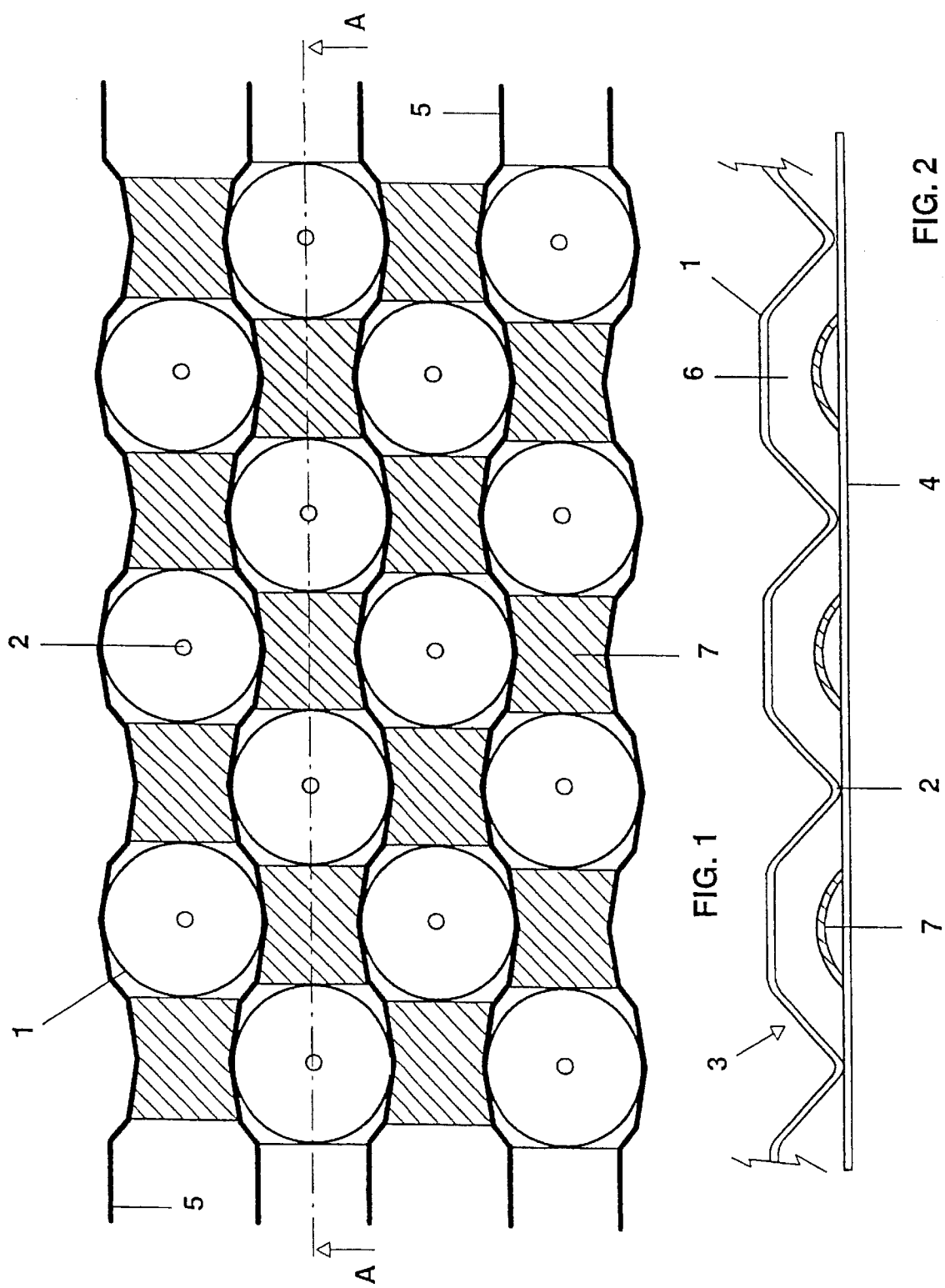
FIG. 1 shows a schematic plan view of an arrangement according to the invention of individual discharges and supporting projections.
FIG. 2 shows a cross-sectional illustration of the arrangement of FIG. 1, along the line A—A in FIG. 1.

FIG. 1 shows a schematic plan view of an arrangement of supporting projections and individual discharge regions that is like a chessboard. In this case, the circles denoted by 1 correspond to the circular shoulder of a supporting projection at the top plate 3 situated above in the cross-sectional view (A—A) in FIG. 2, which are represented as an edge in FIG. 2.

The vertices, of the conical supporting projections, which point downward, that is to say toward the base plate 4, and therefore form the centers of the circles in FIG. 1, are denoted by 2.

In this exemplary embodiment, the top plate 3 is a thermoformed glass plate. The contour of the top side of the top plate 3 is therefore shaped largely like the underside of the top plate 3. However, this is not absolutely necessary. The top side of the top plate 3 could also be flat (or have different shapes). In addition to the points of view of the optical effect of the shape of the top plate 3, that is to say of the supporting projections, in particular, it is necessary in this case chiefly to consider criteria of favorable manufacturing capability.

FIG. 2 shows that the thermoformed conical supporting projections have lateral surfaces running relatively flat. In fact, the vertical dimension is illustrated in an exaggerated way in FIG. 2, so that the supporting projections are actually even flatter than they are portrayed to be. They define with a horizontal line an angle (to be understood toward the base plate) of substantially over 120°, for example of over 130° or even over 140°. The angle between these lateral surfaces and the base plate is therefore small, that is to say is below 60°, and preferably even below 50° or below 40°.

Denoted by 5 in FIG. 1 are electrode strips in the case of which there is no difference between anodes and cathodes, which are therefore all separated by a dielectric layer from the discharge space formed between the top plate 3 and the base plate 4. The discharge space is denoted by 6 in FIG. 2. The electrode strips 5 have shapes that run in the form of zigzags or waves and are composed of rectilinear path segments. Short path segments of the electrode strips 5 between directly adjacent supporting projections are inclined relative to the main strip direction and ensure separation of the discharge regions, which are denoted by 2 and 7 in FIG. 1. If these segments were to be omitted, the discharge regions 7 would just touch. Between these oblique path segments, the electrode strips form indistinct saw tooth shapes in the vicinity of the discharge regions 7 themselves, the tip of the saw tooth being situated in the middle in each case. These electrode shapes are important for localizing individual discharges in the region of the shortest discharge spacings, that is to say between corresponding projecting vertices of the electrode strips 5. An individual discharge of variable extent which can also be divided into a plurality of discharge structures in some circumstances, will burn in each discharge region 7 in the case of this exemplary embodiment.

The exemplary embodiment illustrates that both the supporting projections 1, 2, on the one hand, and the discharge structures 7, on the other hand, are surrounded in each case by identical directly adjacent arrangements (the individual discharges 7 or the supporting projections 1, 2). Only positions arranged at the edge of the discharge lamps are excluded therefrom.

It is to be seen that the line of section A—A illustrated in FIG. 1 runs alternately through supporting projections 1, 2 and discharge structures 7. The illustration in FIG. 2 corresponds to this. The rectangular chessboard-like arrangement produces a simple arrangement here with a multiplicity of neighboring directions of these alternating rows, specifically four horizontal rows and seven vertical rows in the detail, drawn in FIG. 1, of a relatively large lamp structure. It is to be seen in FIG. 2 that the individual discharge structures 7 could also reach in the case of other electrode shapes as far as into the region below the supporting projections 1, 2 of the top plate 3. This also holds, in addition, for a section (not illustrated here) along a vertical line running in FIG. 1 through the supporting projection vertices 2. The individual discharge structures 7 are reproduced in FIG. 1 by shapes that are almost square. In fact, the individual discharges 7 can assume other shapes.

The electrode strips 5 illustrated here additionally have a course which, in addition to locally fixing the individual discharge structures, also exhibits good properties with reference to the dimming capability of the discharges, for which purpose reference is made to the two applications DE 198 44 720 and DE 198 45 228. The dimming function is attended by a modification of the planar extent of the individual discharge structures 7, such that the latter can also be illustrated in a smaller fashion than in FIGS. 1 and 2. It is to be seen, moreover, that the discharge structures 7, which are arranged between the same electrode strips 5, are separated from one another by the supporting projections 1, 2. Because of the separating function of the supporting projections 1, 2 the zigzag shape of the electrode strips 5 in this exemplary embodiment is also only comparatively slightly in evidence, specifically with reference to the discharge spacing, that is to say the spacing between the electrode strips 5.

Figure 3:
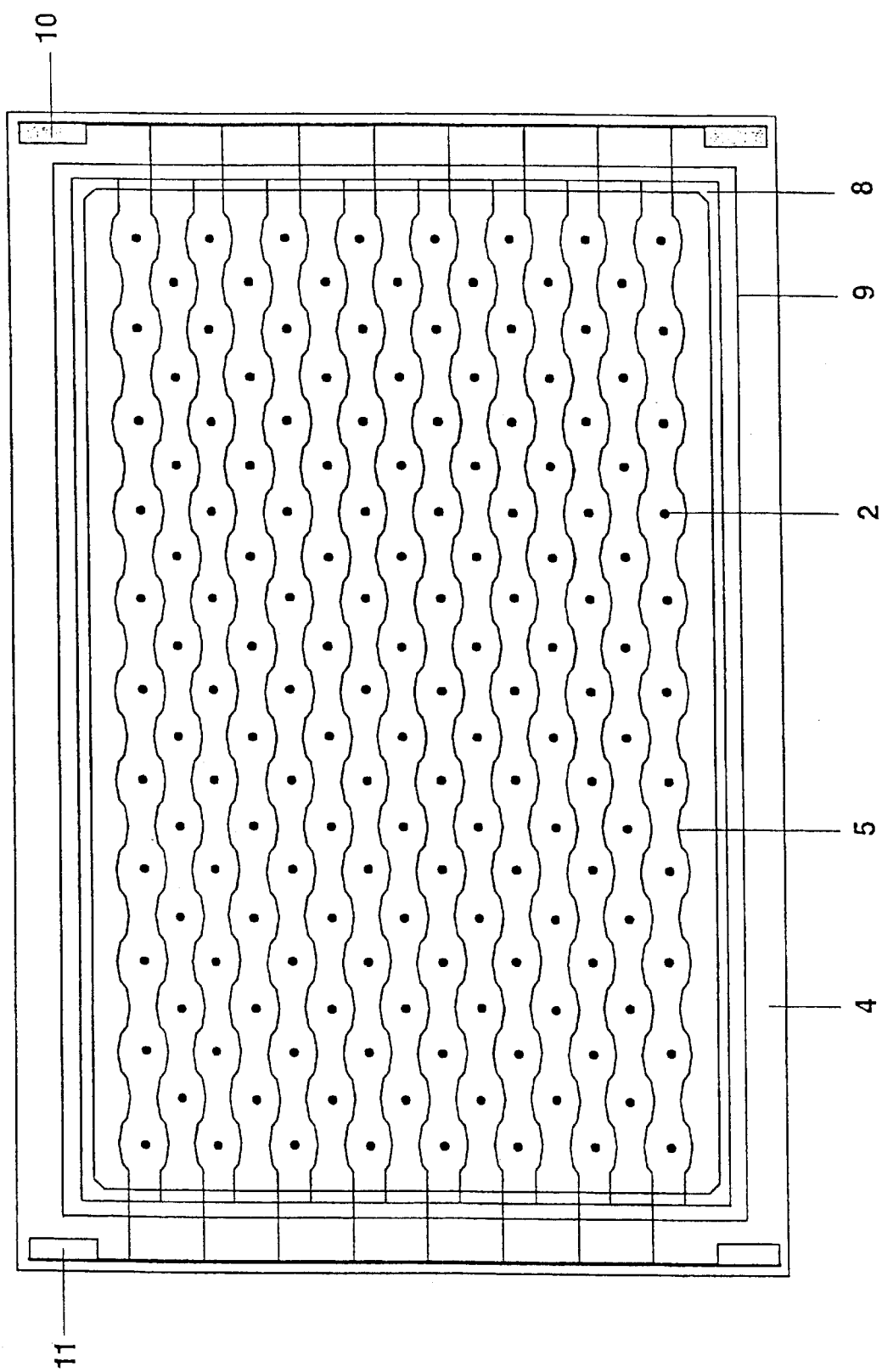
FIG. 3 shows a plan view of an electrode set of a discharge lamp according to the invention, with symbolized contact points of the supporting projections with the base plate, specifically according to the arrangement of FIGS. 1 and 2.

FIG. 3 shows a plan view, corresponding to FIG. 1, of the base plate 4 with the set of electrodes 5. Illustrated here, however, is a complete discharge lamp in the case of which there are provided 21 vertical (in FIG. 3) and 15 horizontal (in FIG. 3) lines with respectively alternating rows of supporting projections 1, 2 and discharge structures 7. The plane of the base plate 4 is illustrated in FIG. 3, and so the supporting projections are shown only with their vertices 2 in the approximate form of a point. For the sake of clarity, the discharge structures 7 are not illustrated, but are seated during operation of the discharge lamp as illustrated in FIGS. 1 and 2. FIG. 3 also shows that the electrode strips 5 are respectively alternately fed to a right-hand collective terminal 10 in FIG. 3 and a left-hand collective terminal 11 in FIG. 3, in order to be connected jointly thereby to an electronic ballast.

FIG. 3 also shows a frame-like structure 8 in the outer region of the base plate 4. Conventionally, use has been made here of glass frames separate from the base and top plates. In this exemplary embodiment, however, it is provided in a way similar to the design of the supporting projections 1, 2 that the "frame" 8 is likewise a projection of the top plate 3, not in the shape of a cone running down to a point, but as a rib. Here, the contact surface of the frame rib 8 with the base plate 4 has a certain width, because it is necessary there to provide a gastight connection between the top plate 3 and the base plate 4, for example by means of a solder glass. In addition, there are no disturbing shadow effects in this region, because it is in any case the edge at which the luminance is already decreasing.

Situated outside the frame rib 8 in FIG. 3 is, moreover, a line 9 which shows the limit of the frame. The frame is bent up outside the rib 8. The electrode terminals (with bus structure) 10 and 11 illustrated outside, here, could also be accommodated in a protected fashion below the bent-up part. In addition, when dimensioning the frame rib 8 the thickness of the solder glass used for fastening must be taken into account with reference to the supporting projections, which only bear against it. The fluorescent coating is situated on the side of the top plate 3 facing the discharge space 6, that is to say on the underside of the top plate 3 in FIG. 2, and covers the top plate 3 completely inside the boundary illustrated in FIG. 3. The lateral surfaces of the supporting projections 1, 2 are therefore also covered with fluorescent material.

Figure 4:
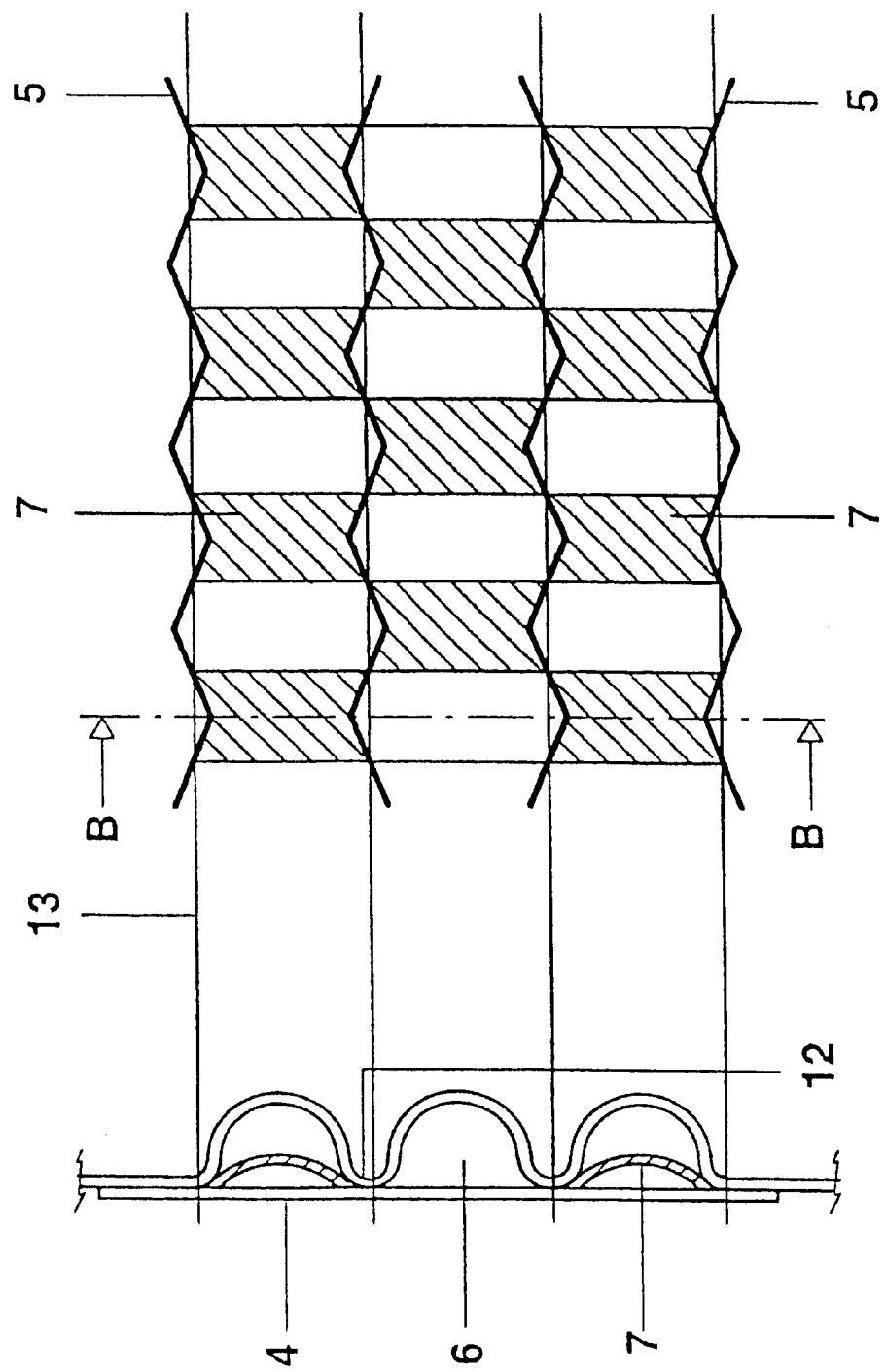
FIG. 4 shows an illustration, corresponding to FIG. 1, of a second exemplary embodiment.

FIG. 4 shows a variant of FIG. 1 as a second exemplary embodiment. In this case, the same reference numerals are used for corresponding parts. The difference from the first exemplary embodiment in FIGS. 1–3 consists in that the supporting projections have a ribbed nature, that is to say rest along a line. They are therefore denoted by 12 in this exemplary embodiment. It is shown by the auxiliary lines 13 that in this exemplary embodiment the supporting projections 12 bear in a linear fashion on the base plate 4 essentially above the electrode strips 5. The zigzag shape of the electrode strips 5 serves in this case to permit the electrode strips to look out alternately to the two sides below the respective supporting projection 12. Consequently, discharges 7 can burn between adjacent electrode strips, specifically precisely in the region of the electrode strips 5 that is not covered by the supporting projections.

In this exemplary embodiment, adjacent discharge structures 7 proceeding from a specific electrode strip 5 to a specific side are therefore also separated in each case by supporting projections. This feature relates, specifically, to the fact that the discharge structures cannot converge to a single discharge structure. This is ensured in the present case by virtue of the fact that the supporting projections 12 cover the electrode strips 5 between such adjacent individual discharges 7 (twice). By contrast therewith, the convergence of adjacent individual discharge structures 7 in the case of the preceding exemplary embodiment had been achieved by the spatial arrangement of the supporting projections 1, 2 between the discharge structures themselves, that is to say between their centroids.

In addition, this exemplary embodiment differs from the preceding one in that the supporting projections are of corrugated design in the cross-sectional profile shown on the left in FIG. 4, and in this case come into contact with the base plate 4 in a somewhat rounded way. Owing to this rounded form of contact, the function of the separation between the discharge regions along the same electrode strip 5 can be better observed. In addition, in this cross-sectional illustration the vertical dimension (in the direction of a perpendicular to the base plate 4) is also illustrated in an exaggerated way. In fact, the structures run flatter. However, the minimum angle of 120° already repeatedly mentioned above is not given over the entire height of the supporting projections in this exemplary embodiment. The middle region of the supporting projections actually runs somewhat more steeply. The upper region and the lower region are, however, in the preferred angular range.

Figure 5:
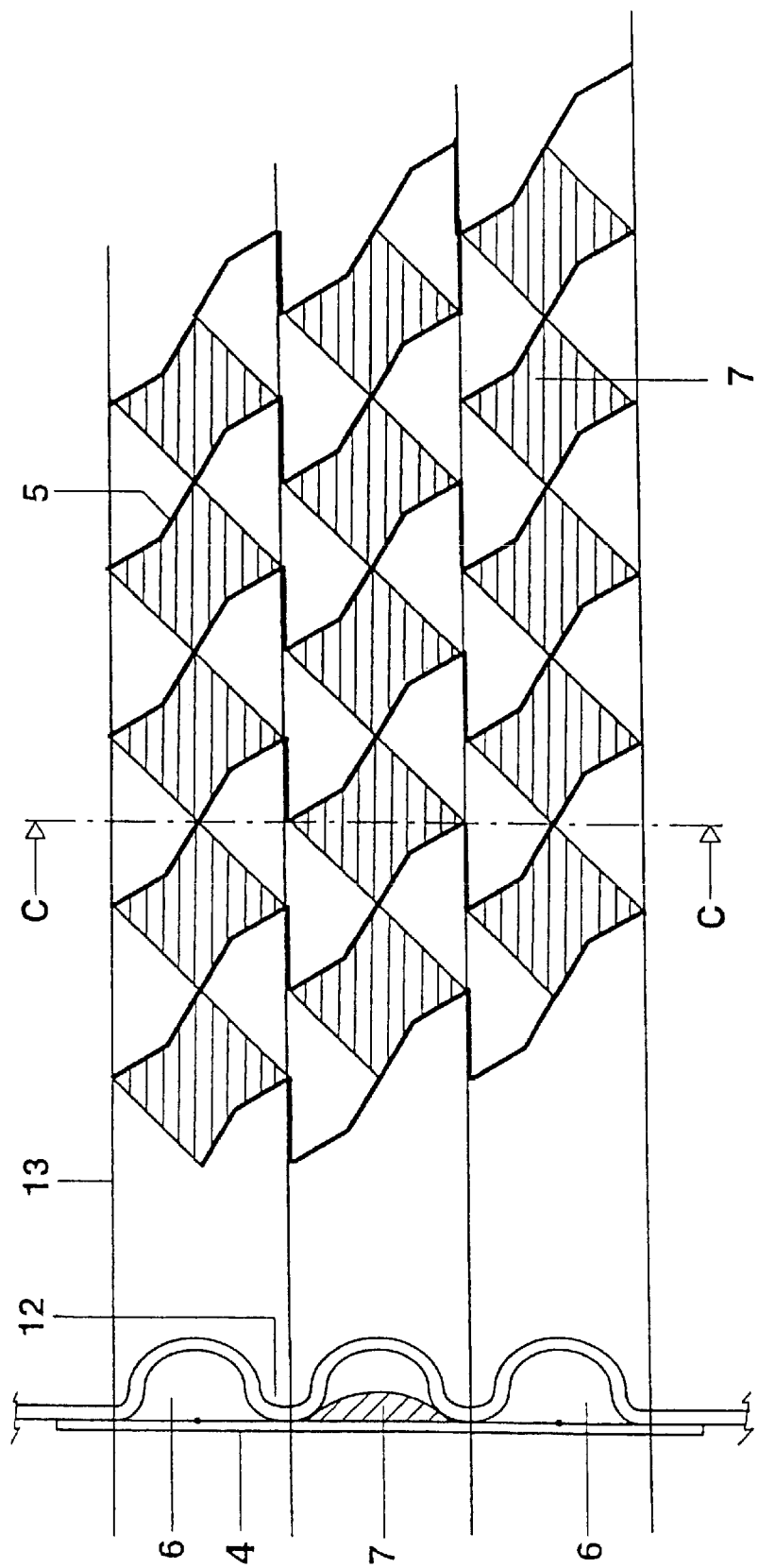
FIG. 5 shows an illustration, corresponding to FIGS. 1 and 4, of a third exemplary embodiment.

FIG. 5 shows a further exemplary embodiment. The lines emboldened represent electrode strips which are denoted, once again, by 5. Otherwise than in the first two exemplary embodiments, in this exemplary embodiment the electrode strips 5 have a shape that is slightly zigzagged, but otherwise continuous and straight. Rather, after a "saw tooth period" of the electrode strips 5 intermediate segments are provided that run obliquely backwards. These intermediate segments are situated in this case in parallel and below rib-like supporting projections 12 which correspond in addition to those of the second exemplary embodiment in FIG. 4. The profiles are once again indicated with the aid of auxiliary lines 13 and illustrated in the left-hand lower region of FIG. 5 in a cross-sectional profile along the line C—C. In this case, as well, the rib-like supporting projections 12 touch the base plate 4 in a somewhat rounded fashion. As a result, discharges can be effectively avoided at the pieces of the electrode strips 5 that are situated in the contact region between the supporting projection 12 and the base plate 4. This is particularly important in this exemplary embodiment, because there occur along the direction of the supporting projections 12 spaces between directly adjacent electrode strips 5 that are shorter than at the points at which the discharge structures 7 are actually intended to burn. Consequently, this somewhat rounded (or alternatively somewhat planar) bearing of the supporting projections 12 on the base plate 4 is favorable in this exemplary embodiment in order to "block" specific parts of the electrode strips 5.

The vertical dimension is once again exaggerated in the sectional illustration. Here, as well, the actual structures are somewhat flatter. The statements relating to FIG. 4 hold for the angles defined by the supporting projections along their height. However, in the case of this embodiment the rounded lower regions of the supporting projections 12 are designed to be yet a little wider in order to be able to cover the corresponding segments of the electrode strips 5 effectively.

A field of individual discharges 7 that is very dense by comparison with the chessboard arrangements of the first and of the second exemplary embodiment results from the particular shape of the electrode strips 5. In the sectional illustration in FIG. 5, the individual discharge 7 illustrated is cut at an oblique angle. By comparison with the sectional illustrations of the discharges in FIGS. 2 and 4, it is therefore not raised from the substrate to the same extent. (As a rule, the invention deals not with surface discharges, but with discharges that burn in the volume of the discharge space and form arcs to some degree). In fact, however, in its middle region the discharge 7 is also spaced somewhat from the base plate 4, something which is no longer illustrated in the drawing.

A common feature of all three exemplary embodiments is that a high degree of plate stability results from the arrangement of supporting projections that is exceptionally dense by comparison with conventional discharge lamps. Consequently, both the top plate 3 and the base plate 4 are of relatively thin-walled design. In addition, as illustrated in FIG. 3, it is provided in the exemplary embodiments that no separate frame is used between the base plate 4 and top plate 3. A drastically reduced outlay on mounting and substantially shortened processing times result from the unipartite design of the supporting projections with the base plate 3.

In addition, the supporting projections illustrated in the exemplary embodiments have shapes that are essential to the invention in each case. In all the exemplary embodiments, they extend from the top plate 3 toward the base plate 4 in a tapering way, the taper taking place in the case of the rib-like supporting projections from the second and the third exemplary embodiment transverse to the rib direction, in each cross-sectional plane perpendicular to the plates in the case of the conical supporting projections 1, 2 from the first exemplary embodiment. In this case, in the first exemplary embodiment angles of 40° occur between the base plate 4 and the lateral surfaces of the supporting projections, the lateral surface of the supporting projections continuing to face the base plate 4 overall. This implies an angle of 140° between the lateral surface and the plane, already explained above, that is parallel to the base plate and runs through the discharge space, this angle of 140° being defined facing the base plate.

When, as in these exemplary embodiments, the top plate 3 is coated together with the supporting projections 1, 2 and 12 with fluorescent material, the result of this is that the emission characteristics of the visible radiation are inclined so as to produce a brightening of the shadow caused by the contact with the base plate 4. Thus, light is reflected from the surroundings into the center of the supporting projection. It is also possible to provide by way of support in this case optically active structures on the top side or above the top plate 3. These optically active structures can be integrated in the top plate 3 or provided as a separate element. Even when the top plate 3 is not coated with a fluorescent material, refraction of light at the lateral surfaces, obliquely facing the base plate 4, of the supporting projections 1, 2 and 12 would produce a similar effect. In this case, the supporting projections are respectively surrounded by an arrangement, as uniform as possible, of discharge structures 7. In the case of the first exemplary embodiment, this is the case because each supporting projection 1, 2 picks up light contributions from four discharge structures 7 distributed uniformly around it and, apart from the edge of the discharge lamp, the supporting projections 1, 2 do not differ therein. In the case of the second exemplary embodiment in FIG. 4, the supporting projection ribs 12 are supplied with light contributions originating from discharge structures 7 on both sides, there being an additional homogenization owing to the alternating arrangement. The third exemplary embodiment in FIG. 5 is further improved to the extent that in additional to the alternating arrangement the discharge structures are situated more densely, thus producing smaller discharge-free regions.

What is claimed is:

1. A discharge lamp having a base plate, a top plate for the light exit, which is at least partially transparent, a discharge space between the base plate and the top plate for holding a discharge medium, an electrode set for producing dielectrically impeded discharges in the discharge medium, a dielectric layer between at least one part of the electrode set and the discharge medium, and at least one support element which produces a connection between the top plate and the base plate, characterized in that the support element is a supporting projection which is constructed as a unipartite component of the top plate, and the outer contour of the supporting projection tapers in the direction from the top plate toward the base plate in at least one cutting plane perpendicular to the base plate.

2. The discharge lamp as claimed in claim 1, in which a multiplicity of supporting projections are provided.

3. The discharge lamp as claimed in claim 2, in which the supporting projections substantially consist of transparent material.

4. The discharge lamp as claimed in claim 1, in which, relative to the discharge space, the supporting projections have an outer surface which extends from the base plate up to the top plate at least substantially in a continuous fashion facing the base plate.

5. The discharge lamp as claimed in claim 4, in which the outer surface of the supporting projections forms, in relation to a plane that cuts the supporting projections and runs at least locally parallel to the base plate between the top plate and the base plate, an angle of at least 120° this angle being defined in a cutting plane perpendicular to said plane and in the direction of the base plate.

6. The discharge lamp as claimed in claim 4, in which the supporting projections have a fluorescent coating on the outer surface facing the discharge space.

7. The discharge lamp as claimed in claim 1, in which the contact between the base plate and the supporting projections is narrow in relation to the dimensions of the supporting projections, in at least one direction.

8. The discharge lamp as claimed in claim 1, in which the supporting projections run like ribs along the top plate.

9. The discharge lamp as claimed in claim 1, in which the supporting projections are limited along the top plate to a respective region that is very small in relation to the dimensions of the top plate.

10. The discharge lamp as claimed in claim 9, in which the supporting projections substantially take the form of cones or pyramids with vertices touching the base plate.

11. The discharge lamp as claimed in claim 1, in which the supporting projections only bear against the base plate.

12. The discharge lamp as claimed in claim 1, in which there exists in a plane between the base plate and the top plat a direction through the discharge space along which supporting projections and individual discharges alternate in a row.

13. The discharge lamp as claimed in claim 12, in which a multiplicity of parallel rows of alternating support elements and discharge structures exist.

14. The discharge lamp as claimed in claim 12, in which the electrode set includes a number of strip-shaped electrodes, and discharge structures that are arranged on one and the same electrode strip adjacent to the same side of the electrode strip are separated in each case by a supporting projection.

15. The discharge lamp as claimed in claim 13, which is designed to the effect that the projecting elements and the discharge structures form a chessboard-like arrangement.

16. The discharge lamp as claimed in claim 1, in which the maximum distance between directly adjacent supporting projections is at most 30 mm.

17. The discharge lamp as claimed in claim 1, in which an optical diffusion element is provided on or above the light-emitting side.

18. The discharge lamp as claimed in claim 1, which is designed for bipolar operation.

19. A display device having a discharge lamp as claimed in claim 1, which serves for backlighting the display device.

* * * * *